(12) United States Patent
Hirai (10) Patent No.: US 7,013,078 B2
(45) Date of Patent: Mar. 14, 2006

(54) DATA PROCESSING APPARATUS, DATA PROCESSING METHOD, DATA READING APPARATUS, AND RECORDING APPARATUS

(75) Inventor: Jun Hirai, Tokyo (JP)

(73) Assignee: Sony Corporation, (JP)

( * ) Notice: Subject to any disclaimer, the term of this patent is extended or adjusted under 35 U.S.C. 154(b) by 1094 days.

(21) Appl. No.: 09/750,370

(22) Filed: Dec. 28, 2000

(65) Prior Publication Data

US 2001/0019659 A1    Sep. 6, 2001

(30) Foreign Application Priority Data

Dec. 29, 1999    (JP)    ............................... P11-377255

(51) Int. Cl.
*H04N 5/91*    (2006.01)
(52) U.S. Cl. .......................... 386/94; 360/60; 380/201; 380/203; 705/51
(58) Field of Classification Search .................. 386/94; 360/60; 380/201, 203; 705/51
See application file for complete search history.

(56) References Cited

U.S. PATENT DOCUMENTS

| | | | | |
|---|---|---|---|---|
| 5,889,919 A | * | 3/1999 | Inoue et al. | 386/94 |
| 6,208,735 B1 | * | 3/2001 | Cox et al. | 380/54 |
| 6,359,998 B1 | * | 3/2002 | Cooklev | 382/100 |
| 6,374,036 B1 | * | 4/2002 | Ryan et al. | 386/94 |
| 6,434,322 B1 | * | 8/2002 | Kimura et al. | 386/94 |
| 6,546,113 B1 | * | 4/2003 | Lucas et al. | 382/100 |
| 6,700,989 B1 | * | 3/2004 | Itoh et al. | 382/100 |

* cited by examiner

*Primary Examiner*—James J. Groody
*Assistant Examiner*—Helen Shibru
(74) *Attorney, Agent, or Firm*—Lerner, David, Littenberg, Krumholz & Mentlik, LLP (57) ABSTRACT

In a data processing apparatus and method, watermark information embedded in data can be detected even if the data is subjected to various processing. The apparatus includes a processor for processing data, an output unit for outputting the data processed by the processor, a measurement unit for measuring and determining a processing record of the processed data, and a controller for controlling the operation of the processor based on the processing record.

28 Claims, 8 Drawing Sheets

DATA PROCESSING APPARATUS, DATA PROCESSING METHOD, DATA READING APPARATUS, AND RECORDING APPARATUS

BACKGROUND OF THE INVENTION

The present invention generally relates to a data processing apparatus, a data processing method, a data reading apparatus, and a data recording apparatus. More particularly, the present invention relates to a data processing apparatus, a data processing method, a data reading apparatus, and a data recording apparatus incorporated in a watermark embedding system for embedding digital watermark information in information signals for the purpose of copyright protection.

In recent years, as digital content delivered over the Internet or contained on digital video discs (DVDs) has become widely available, there are problems with copyright violation due to unauthorized reproduction of video/image/audio data content.

To address such copyright violation problems, one approach has been proposed in which additional information for copyright protection, such as copy control information, is added to the video/image/audio content to prevent unauthorized reproduction of the content.

This additional copyright information is inserted in the content so that it becomes difficult to tamper with, falsify, or remove the copyright information, and unauthorized reproduction of the content can be effectively prevented.

One possible way to embed such additional information in the content is a digital watermarking technique. This technique allows additional information for copyright protection, such as copy control information, to be embedded as noise in perceptually less significant regions of video or music data, or in regions of the video or music data which are redundant. Specifically, for example, a spread-spectrum watermarking method is contemplated in which key patterns generated using random numbers or M-sequences are employed for addition or detection of additional information.

Additional information embedded in video or music data by this digital watermarking technique is difficult to remove as well as difficult to tamper with. Furthermore, if the video or music data is filtered or compressed, the embedded additional information can still be detected from the video or music data.

Superposing additional information on video data or the like according to the digital watermarking technique may thus provide an anti-tampering function to prevent unauthorized reproduction of the data.

However, conventional devices such as DVD (Digital Video Disc) players may encounter problems in that additional information such as copy control information which forms a watermark embedded in video data or the like is undetectable because the watermarking format is altered.

For example, additional copy control information may be a spread-spectrum watermark using random numbers and may be added to the video data as watermark information. In a DVD player for playing a DVD having the video data recorded thereon, once the video data read from the DVD is subjected to zooming for image enlargement, interpolation of pixels or horizontal lines of the image may occur. Thus, if the resultant spread-spectrum data is despread, the copy control information embedded therein would be undetectable.

Signal processing other than zooming, such as image rotation, inversion, cropping in which some portions of the image are cropped, or image shifting, which operations may change the number of pixels or lines, or their positions, or which may involve interpolation or decimation, would also cause problems in that the watermark information would be undetectable.

SUMMARY OF THE INVENTION

Accordingly, it is an object of the present invention to provide a data processing apparatus, a data processing method, a data reading apparatus, and a data recording apparatus, in which a watermark embedded in data can be detected even if various processing is performed on that data.

To this end, in one aspect of the present invention, there is provided a data processing apparatus including a processor operable to process data to produce processed data, an output unit operable to output the processed data, a measurement unit operable to measure and determine a processing record for the processed data, and a controller operable to control the operation of the processor based on the processing record.

According to another aspect of the present invention, a method for processing data and outputting the processed data includes the steps of determining a processing record for the processed data, and controlling the output of the processed data based on the processing record.

According to still another aspect of the present invention, a data reading apparatus includes a reader operable to read data from a medium, a processor operable to process the read data to produce processed data, an output unit operable to output the processed data, a measurement unit operable to measure and determine a processing record for the processed data, and a controller operable to control the operation of the processor based on the processing record.

According to a further aspect of the present invention, a data recording apparatus includes a processor operable to process data to produce processed data, an output unit operable to output the processed data, a recorder operable to record the processed data output by the output unit on a medium, a measurement unit operable to measure and determine a processing record for the processed data, and a controller operable to control the operation of the processor based on the processing record.

According to the present invention, therefore, a processing record is determined for data that undergoes processing, and the output of the processed data is controlled based on the processing record, whereby continuous processing of the data is prevented.

Furthermore, when the data is watermarked with recording control information for controlling the recording the data on a medium, the output of the processed data is controlled based on the processing record. Therefore, a continuous undetectable state of the embedded recording control information due to the data processing is prevented.

DESCRIPTION OF THE PREFERRED EMBODIMENTS

An embodiment of the present invention is now described in detail with reference to the accompanying drawings.

Figure 1:
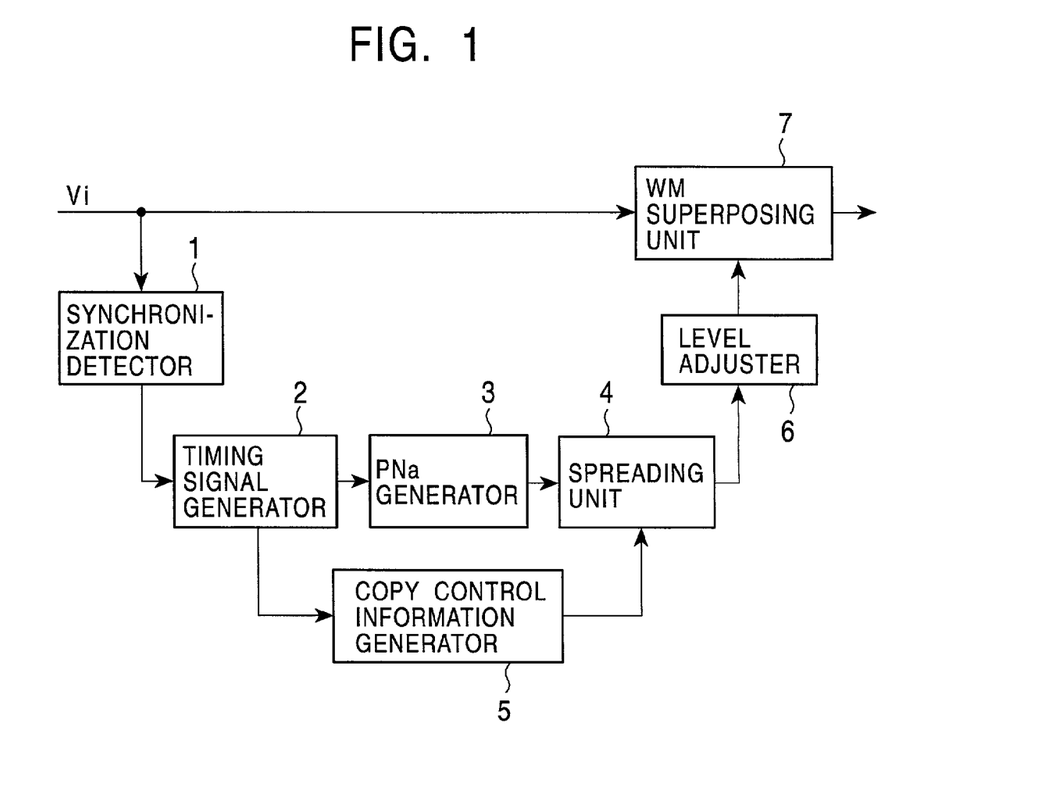
FIG. 1 is a block diagram of a digital watermark adding apparatus according to the present invention.

FIG. 1 illustrates a digital watermark adding apparatus for adding watermark information WM to video signals. In the illustrated example, pseudo-random noise (PN) codes which are used as spreading codes and which are generated in a sufficiently short time are multiplied by additional copy control information to perform spread spectrum, so that narrow-band and high-level signals for the copy control information are transformed into broad-band and low-level signals which do not influence the video signals. The spread-spectrum copy control information is superposed on the video data which is then recorded on a recording medium or is otherwise transmitted over a network.

Referring to FIG. 1, vertical synchronizing signals of video signals Vi are detected by a synchronization detector 1, and the detection outputs are sent to a timing signal generator 2. The timing signal generator 2 generates timing signals synchronized with the vertical synchronizing signals.

In synchronization with the timing signals from the timing signal generator 2, a PNa generator 3 generates PN code strings PNa for each vertical synchronizing signal in the illustrated example. The PN code strings PNa are then transferred to a spreading (spread spectrum) unit 4.

In synchronization with the timing signals from the timing signal generator 2, a copy control information generator 5 generates copy control information to be superposed on the video signals Vi as watermark information WM, and transfers the generated information to the spreading unit 4. The copy control information to be superposed on the video signals Vi is determined depending upon the data (video image) to be transmitted or recorded, to indicate "copying allowed," "copying allowed once," "copying prohibited," and the like.

The spreading unit 4 generates spread-spectrum signals by multiplying the copy control information and the PN code strings PNa. The spread-spectrum signals are sent via a level adjuster 6 to a watermark superposing unit 7 for superposing the spread-spectrum signals on the video signals Vi as watermark information WM. The level adjuster 6 adjusts the superposition level so that the superposed watermark information WM does not degrade the read images. In this example, the spread-spectrum (SS) watermark information is superposed at a level lower than the dynamic range of the video signals Vi.

Figure 2A:
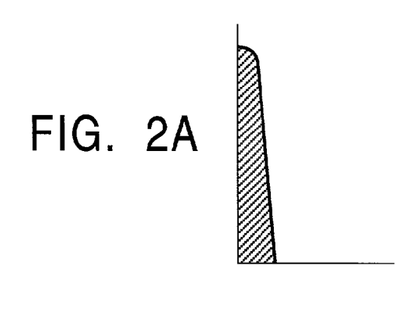
FIGS. 2A to 2D are characteristic curve plots each showing a signal spectrum.
Figure 2B:
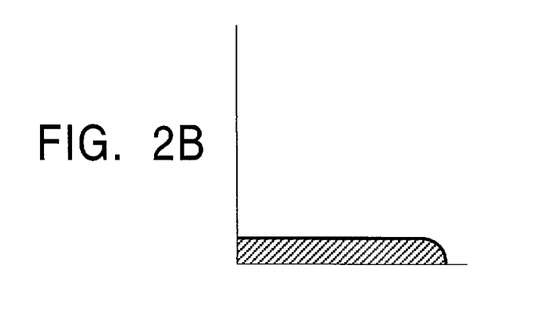

FIGS. 2A to 2D illustrate the relationships between the copy control information superposed on the video signal as the watermark information WM, and the video signal, as indicated by a spectrum. The copy control information has a small amount of information contained therein, and represents a low bit-rate signal having a narrow band, as shown in FIG. 2A. FIG. 2B shows a signal having a broad bandwidth after spread spectrum is performed, where the spread-spectrum signal level is lowered in inverse proportion to the widening of the bandwidth.

Figure 2C:
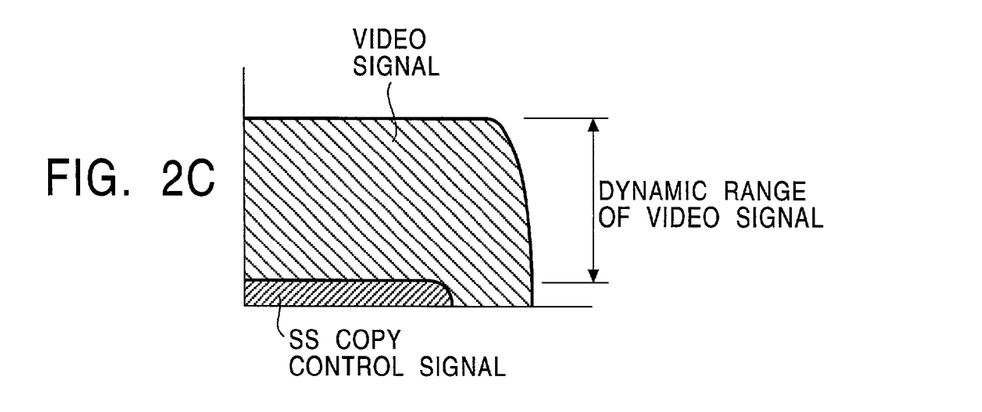

The spread-spectrum signal or the SS copy control information is superposed on the video signal Vi by the WM superposing unit 7. As shown in FIG. 2C, the SS copy control information is superposed thereon at a level lower than the dynamic range of the video signal Vi. Superposing the SS copy control information in this way substantially prevents degradation of such main information signals (video signals). Therefore, when the video signals Vi having the SS copy control information superposed thereon are sent to a monitor receiver to obtain a video image, as previously described, the obtained video image is not substantially affected by the SS copy control information, making the image superior.

Figure 2D:
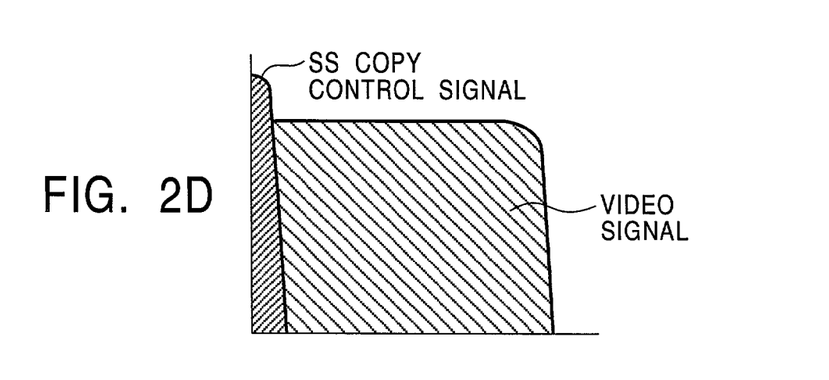

The SS copy control information is despread for detection, as will be described later, so that the SS copy control information is restored as a narrow-band signal, as shown in FIG. 2D. With a sufficient band spreading coefficient, the despread copy control information has a higher power than the information signal (video signal), and the copy control information can be detected.

Since the watermark information is superposed on the video signals at the same time and with the same frequency as those of the video signals, it is difficult to delete or modify the watermark information by frequency filtering or simple information replacement.

Therefore, the SS copy control information superposed on the video signals cannot be removed and is difficult to tamper with, whereby copy control is provided in which unauthorized reproduction is prevented without fail.

In the illustrated structure, the vertically synchronizing PN code strings using vertical synchronizing signals as reference signals are employed for spread spectrum. Hence, despread spectrum PN code strings required to detect the spread-spectrum signals from the video signals Vi can be readily generated based on signals synchronized with the vertically synchronizing signals detected from the video signals Vi.

Figure 3:
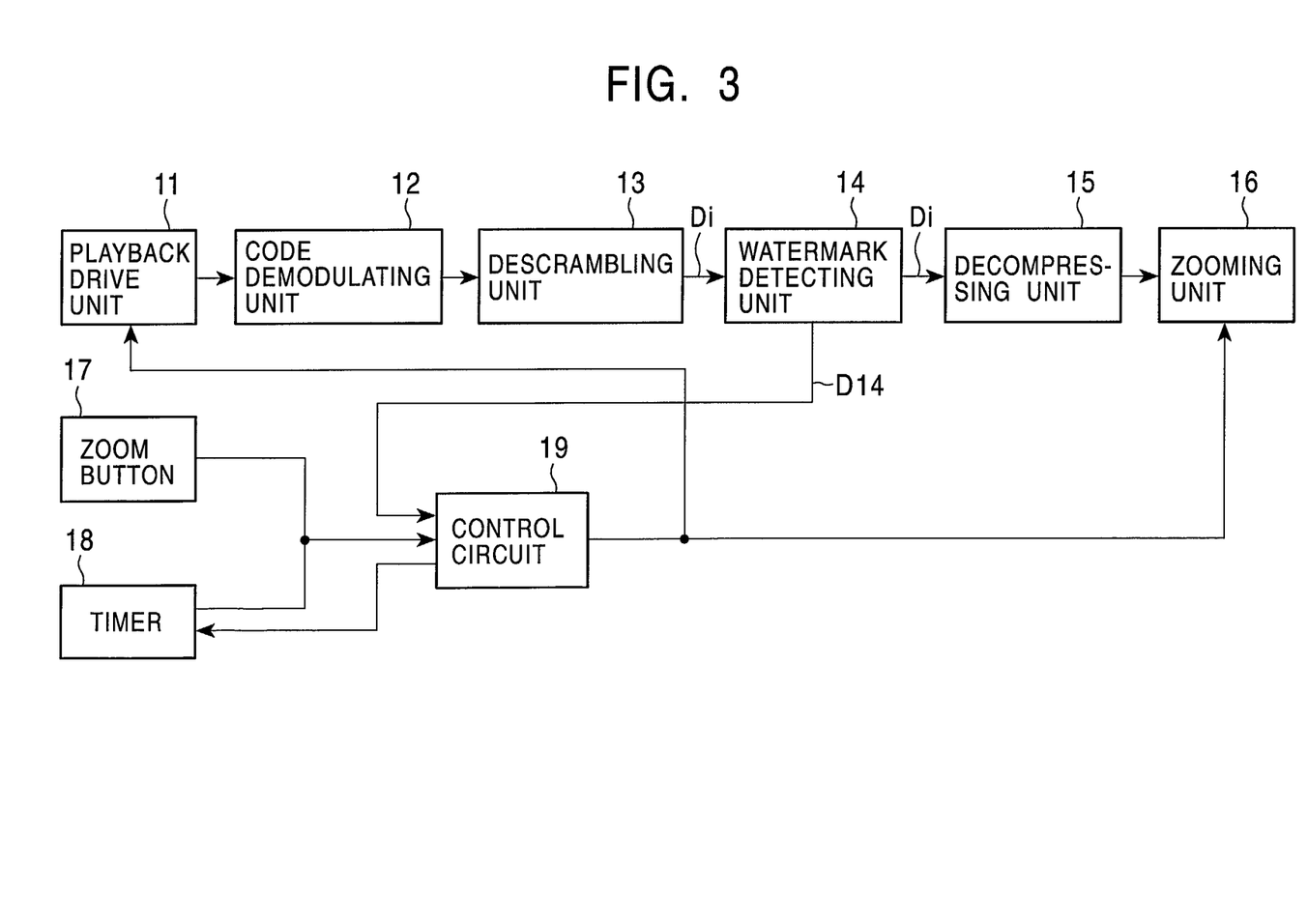
FIG. 3 is a block diagram of a DVD player according to the present invention.

FIG. 3 illustrates a DVD player. A playback drive unit 11 plays back a DVD to read data therefrom, and the read data is demodulated and error corrected by a code demodulating unit 12, and is then descrambled by a descrambling unit 13. The descrambling unit 13 transfers the descrambled data Di to a watermark detecting unit 14.

Figure 4:
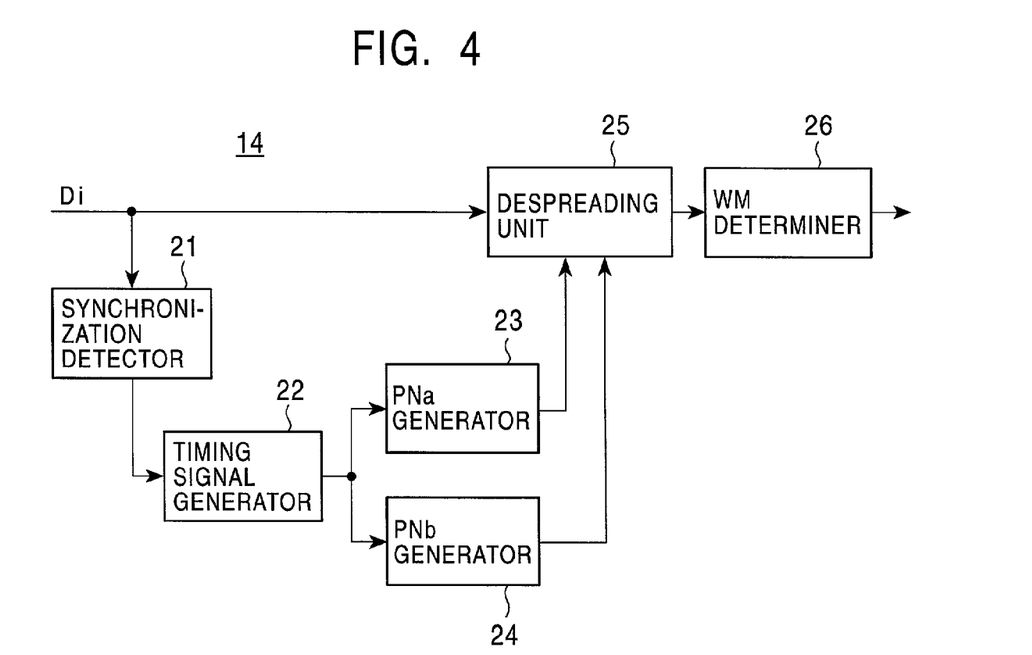
FIG. 4 is a block diagram of a watermark detecting unit shown in FIG. 3.

FIG. 4 further illustrates the watermark detecting unit 14.

The data Di from the descrambling unit 13 is distributed to a despreading unit 25 and to a synchronization detector 21. The synchronization detector 21 detects vertical synchronization timing, and sends the detection output to a timing signal generator 22.

In turn, the timing signal generator 22 generates vertical synchronization timing signals to a PNa generator 23 and a PNb generator 24. The PNa generator 23 generates PN code strings that are of the same type as those of the PNa generator 3 in the watermark adding apparatus previously described with reference to FIG. 1, and the PN code strings PNa are generated in the same vertical synchronization timing as in the watermark adding apparatus shown in FIG. 1. The PNb generator 24 generates PN code strings PNb which are used to detect any modified watermark information WM in a recording apparatus as will be described later, and are identical to PN code strings PNb for modification in the recording apparatus.

The PN code strings generated by the PNa generator 23 and the PNb generator 24 are fed to the despreading unit 25 in which the spread-spectrum copy control information is despread. The despreading operation using the two types of PN code strings PNa and PNb allows the despreading unit 25 to detect one or two pieces of copy control information, and the copy control information pieces are sent to a watermark information (WM) determiner 26. The WM determiner 26 determines as the output which one of the copy control information pieces more closely indicates "copying prohibited" information. The determined output is then transferred to a control circuit 19 (FIG. 3).

The data Di in which the embedded watermark information has been detected by the watermark detecting unit 14 is forwarded to a decompressing unit 15 in which the data is decompressed according to MPEG (motion picture expert group) decompression back to a baseband signal, and is then sent to a zooming unit 16.

The DVD player also includes a zoom button 17 and a timer 18. When a user presses the zoom button 17, the control circuit 19 instructs the zooming unit 16 to execute a zooming operation. The control circuit 19 also instructs the timer 18 to start a time measurement operation. In response, the timer 18 starts measurement of time.

When a predetermined time elapses, the timer 18 tells the control circuit 19 of the elapse of the time. In response, the control circuit 19 instructs the zooming unit 16 to discontinue the zooming operation. The zooming unit 16 discontinues the zooming operation on the video image accordingly. Thus, the video image output from the zooming unit 16 is returned to the original image prior to the zooming operation.

The video signals from the zooming unit 16 are output via a digital interface or an analog interface (not shown), or are otherwise encoded into television signals according to the NTSC (National Television System Standard Committee) system or the PAL (phase alternation by line) system and are output as composite signals or separate video signals.

Figure 5:
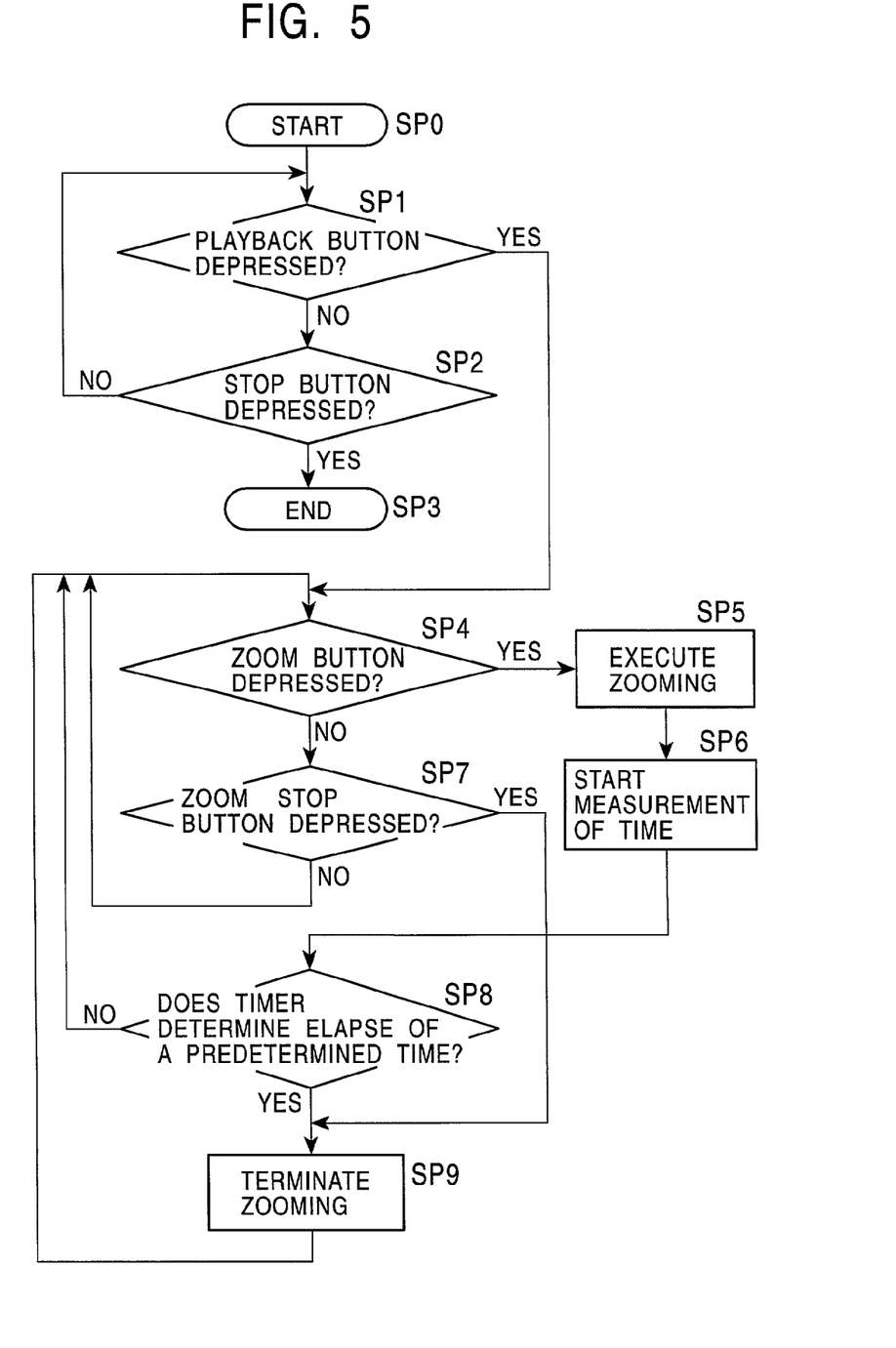
FIG. 5 is a flow chart describing a zooming procedure according to the present invention.

FIG. 5 is a flow chart describing a zooming procedure performed by the control circuit 19 in the DVD player, which starts at Step SP0. At Step SP1, the control circuit 19 determines whether or not a playback button has been pressed, and further determines at Step SP2 whether or not a stop button has been pressed. If NO is obtained at both Steps SP1 and SP2, indicating that the user is not operating the DVD player, the control circuit 19 repeats Steps SP1 and SP2 until YES is obtained at either Step SP1 or SP2.

If YES is obtained at Step SP2, indicating that the user pressed the stop button, the control circuit 19 proceeds to Step SP3 wherein the control ends. On the other hand, if YES is obtained at Step SP1, indicating that the user pressed the playback button, the control circuit 19 proceeds to Step SP4 to determine whether or not the zoom button 17 (FIG. 3) has been pressed.

If YES is obtained at Step SP4, indicating that the user pressed the zoom button 17 when the DVD player is performing playback, the control circuit 19 proceeds to Step SP5, instructing the zooming unit 16 (FIG. 3) to execute a zooming operation. The control circuit 19 further proceeds to Step SP6, instructing the timer 18 to start a time measurement operation. The timer 18 starts measurement of time accordingly.

In this way, when the zooming operation is started, the timer 18 also starts measurement of time. The control circuit 19 then proceeds to Step SP8 to determine whether or not the timer 18 has determined the elapse of a predetermined time. If NO is obtained at Step SP8, indicating that the predetermined time has not elapsed since the zooming operation started, the control circuit 19 repeats Steps SP4 to SP6.

If YES is obtained at Step SP8, indicating that the timer 18 has determined the elapse of the predetermined time, the control circuit 19 proceeds to Step SP9 wherein it instructs the zooming unit 16 to discontinue the zooming operation, and then the control ends.

Therefore, in the DVD player, a zooming operation is initiated by a user operation, and the zooming operation is discontinued when a predetermined time has elapsed, so that the zoomed video image is returned to the original image.

Meanwhile, if YES is obtained at Step SP7, indicating that the user pressed a zoom stop button, the control circuit 19 jumps to Step SP9 wherein the zooming operation is terminated as requested by the user.

The video signals read from the DVD by the DVD player, which, if desired, are subjected to zooming, are forwarded to a monitor for visual display, or otherwise to any other recording apparatus in which the signals may be recorded on any other recording medium.

Figure 6:
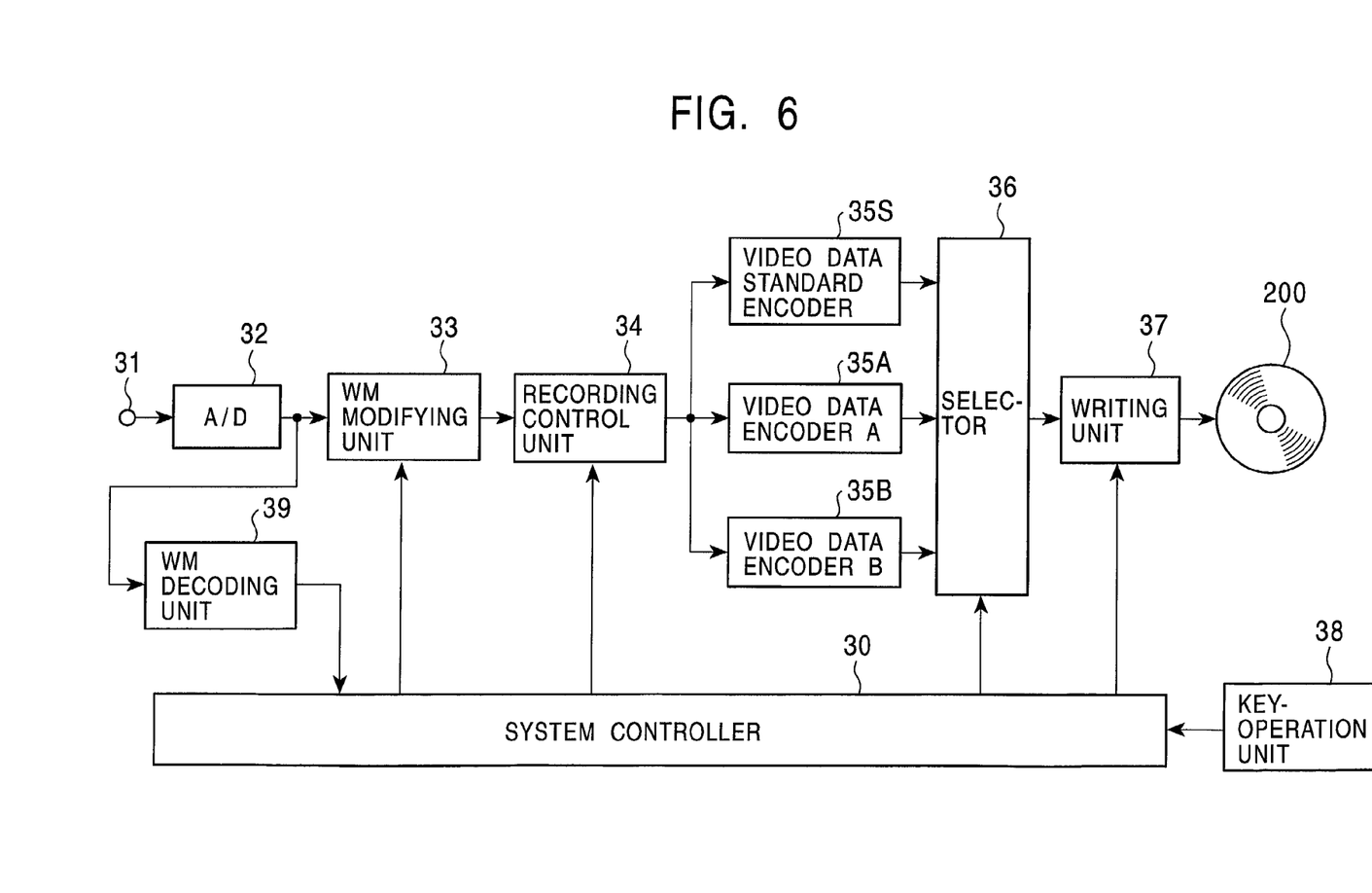
FIG. 6 is a block diagram of a recording apparatus subsequent to the DVD player shown in FIG. 3.

FIG. 6 illustrates a DVD recorder for recording video signals on a DVD. The video signals input through an input terminal 31 are converted into digital signals by an analog/digital (A/D) converter 32 before being fed to a watermark information WM modifying unit 33 (hereinafter referred to as WM modifying unit). The WM modifying unit 33 modifies the watermark information WM superposed on the input video signals under the control of a system controller 30 when a WM decoding unit 39 determines that the watermark information WM represents "copying allowed once," so that the modified watermark information WM superposed on the recorded video data represents "copying prohibited."

The output of the WM modifying unit 33 is sent to a recording control unit 34. The recording control unit 34 controls whether to execute or prohibit the recording of data in response to a control signal from the system controller 30.

The control signal is generated by the system controller 30 based on the output of the WM decoding unit 39. More specifically, when it is determined from the output of the WM decoding unit 39 that the copy control information in the form of watermark represents "copying prohibited," the system controller 30 sends to the recording control unit 34 a control signal indicating that recording should be prohibited. In response, the recording control unit 34 determines that the recording of encoded video signals is prohibited, and does not distribute the video signals to the subsequent circuits.

When it is determined from the output of the WM decoding unit 39 that the copy control information in the form of a watermark represents "copying allowed" or "limited copying allowed," the system controller 30 sends to the recording control unit 34 a control signal indicating that recording is allowed. In response, the recording control unit 34 distributes the video signals to subsequent encoders 35S, 35A, and 35B.

The encoder 35S is a standard encoder capable of compression and encoding in which the copy control information in the form of a watermark superposed on the video signals for the purpose of copyright protection is detected without fail after it has been decoded.

On the other hand, the encoders 35A and 35B are video data encoders which encode such that the copy control information in the form of a watermark superposed on the video signals for the purpose of copyright protection is difficult to detect or is undetectable after being decoded.

The video signals encoded by these encoders 35S, 35A, and 35B are fed to a selector 36. The selector 36 selects any of the outputs of these encoders 35S, 35A, and 35B in response to a select control signal from the system controller 30.

A select instruction indicating which encoder to be used is input to the system controller 30 through a key-operation unit 38. The system controller 30 in turn generates a select control signal based on the input select instruction to indicate which encoder should be selected from among the encoders 35S, 35A, and 35B.

The encoder output selected by the selector 36 is forwarded to a writing unit 37. The writing unit 37 writes the video signals to a DVD 200 when recording is allowed under the control of the system controller 30.

When it is determined from the output of the WM decoding unit 39 that the copy control information represents "copying prohibited" or "limited copying allowed," the use of the video data encoders 35A and 35B is restricted. In other words, when the copy control information detected by the WM decoding unit 39 represents "copying prohibited" or "limited copying allowed," the system controller 30 always selects the video data standard encoder 35S, whatever select instruction is given by the user.

Therefore, in the case of "limited copying allowed," the writing unit 37 would record on the DVD 200 the video data that is compressed and encoded by the standard encoder 35S. Should the recorded video data be read and decoded, a situation in which the embedded watermark information is not detected to disable a copy generation management system would be avoided.

If no watermark information (copy control information) is detected from the video signals by the WM decoding unit 39, the system controller 30 sends a control signal to the recording control unit 34 indicating that recording is allowed. Therefore, it is possible to use recording media such as DVDs that have had content recorded thereon before a digital watermarking technique, in which additional information such as copy control information is embedded in content such as video signals, was put into practice, and the recording of the content read from such recording media is also allowed.

When copy control information is embedded as watermark information in the video signals read by such a DVD player as shown in FIG. 3, if the video signals have been subjected to zooming, the pixels or horizontal lines of the video image are interpolated. The superposed watermark information cannot be thus readily detected by the WM decoding unit 39 in the DVD recorder (FIG. 6).

By employing the zooming procedure described with reference to FIG. 5, however, the zooming operation is discontinued in the DVD player after the elapse of a predetermined time so that the zooming operation is not continuously performed for a long time. With the input video signals subjected to zooming in the DVD recorder (FIG. 6), the zooming operation would be thus discontinued after the elapse of a predetermined time. As a result, the WM decoding unit 39 can detect the embedded watermark information from the video signal which is not subjected to zooming.

Once the embedded watermark information is detected by the WM decoding unit 39, the system controller 30 allows or prohibits the recording of the video signals according to the copy control information in the form of a watermark.

In this way, after the elapse of a predetermined time, the zooming operation is discontinued in the DVD player (FIG. 3) so that a long, continuous zooming operation may be avoided. Therefore, in a DVD recorder which records zoomed video signals on the DVD, the embedded watermark information cannot be detected from these video signals only for a restricted period of time (until the zooming operation is discontinued in the DVD player). In the DVD recorder, therefore, when at least a predetermined time has elapsed, the embedded watermark information (copy control information) can be detected from the video signals and can be recorded. Copyright of the video image can thus be protected.

According to this embodiment, upon user-requested zooming, the video signals read from the DVD are subjected to zooming in the DVD player. If the user does not request that the zooming be stopped within a predetermined time, the control circuit 19 discontinues the zooming operation. Once the zooming operation has been discontinued, the video signals are returned to the original unzoomed signals, and the watermark information (copy control information) superposed on the video signals can be detected.

Since the embedded watermark information (copy control information) is undetectable only for a restricted period of time due to processing such as zooming, once at least the predetermined time has elapsed, the embedded watermark information (copy control information) can be detected in the DVD recorder. The recording of the video signals on the DVD can then be allowed or prohibited.

Copyright of the video image is thus protected regardless of whether processing such as zooming has been performed on the video signals.

The same is true when the user requests processing such as zooming on the video signals in the DVD player. The processing is forcibly discontinued after a predetermined time, preventing continuous processing on the video signals. This can prevent the video image from being unscrupulously used without the permission of the artist.

According to the present invention, since processing such as zooming performed on video signals is discontinued after a predetermined time, it is only for a restricted period of time that the watermark information superposed on the video signals cannot be detected therefrom. Being unable to detect the embedded watermark information for a long period of time is thus avoided, and the copyright of the video image is therefore protected.

Furthermore, since processing such as zooming is discontinued after a predetermined time, the DVD recorder does not require a circuit for detecting the watermark information embedded in video signals while the video signals are subjected to processing such as zooming. This prevents the WM decoding unit 39 from being complicated in structure.

Figure 7:
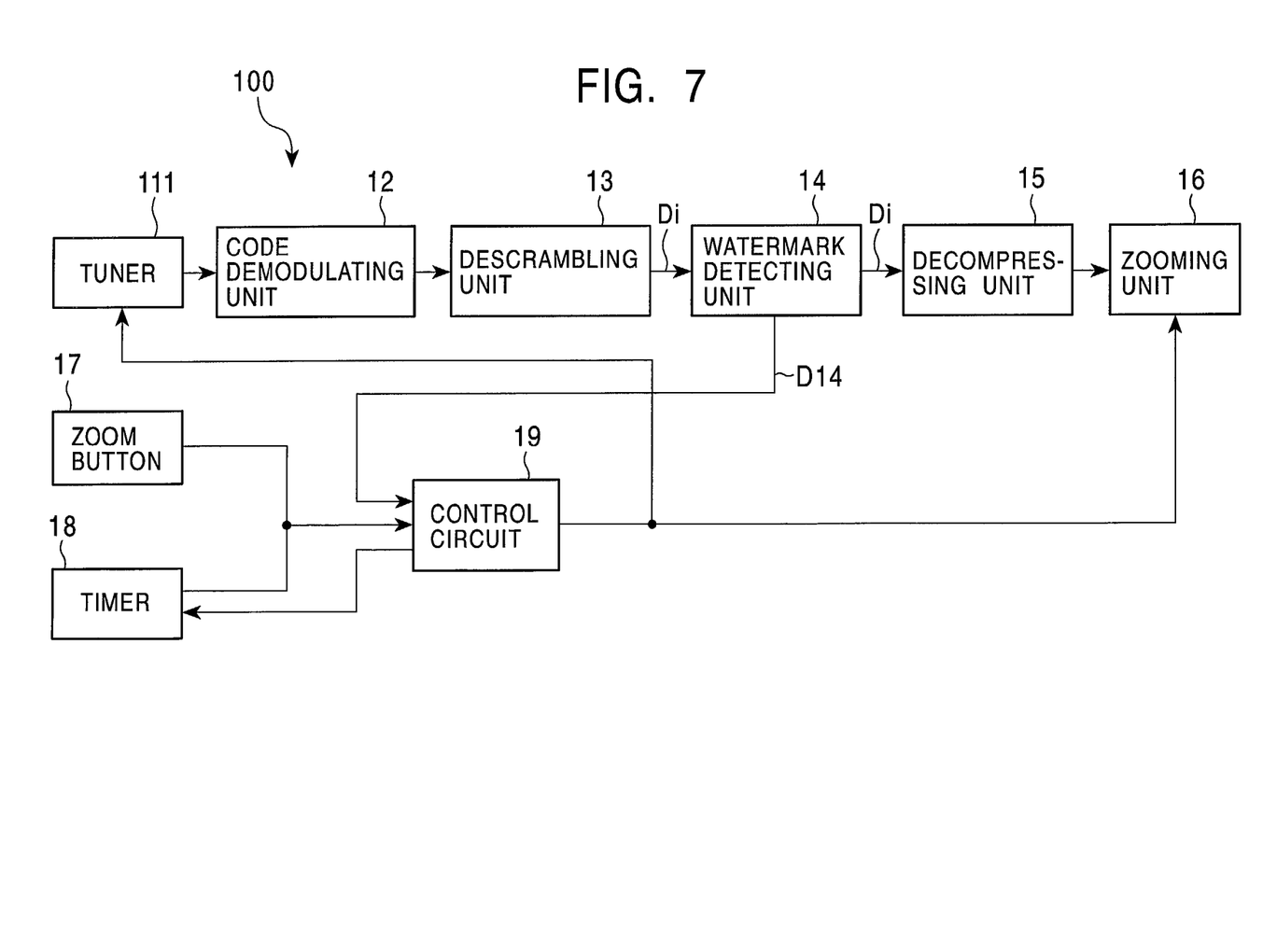
FIG. 7 is a block diagram of a receiver according to another embodiment of the present invention.

While a DVD player incorporating the present invention has been described in the preferred embodiment, the present invention is not limited thereto, and a receiver (set-top box) may also be implemented. FIG. 7 illustrates a receiver 100 for receiving and outputting video signals delivered by digital broadcasting and the like. In FIG. 7, the same reference numerals are assigned to the corresponding components as those shown in FIG. 3.

Upon a request from the user, the received video signals are subjected to processing such as zooming, and the measurement of the timer 18 allows the processing of the video signals to be discontinued after a predetermined time. Then, it is only for a restricted period of time that the watermark information superposed on the delivered video signals cannot be detected, and copyright of the video image is thus protected.

Figure 8:
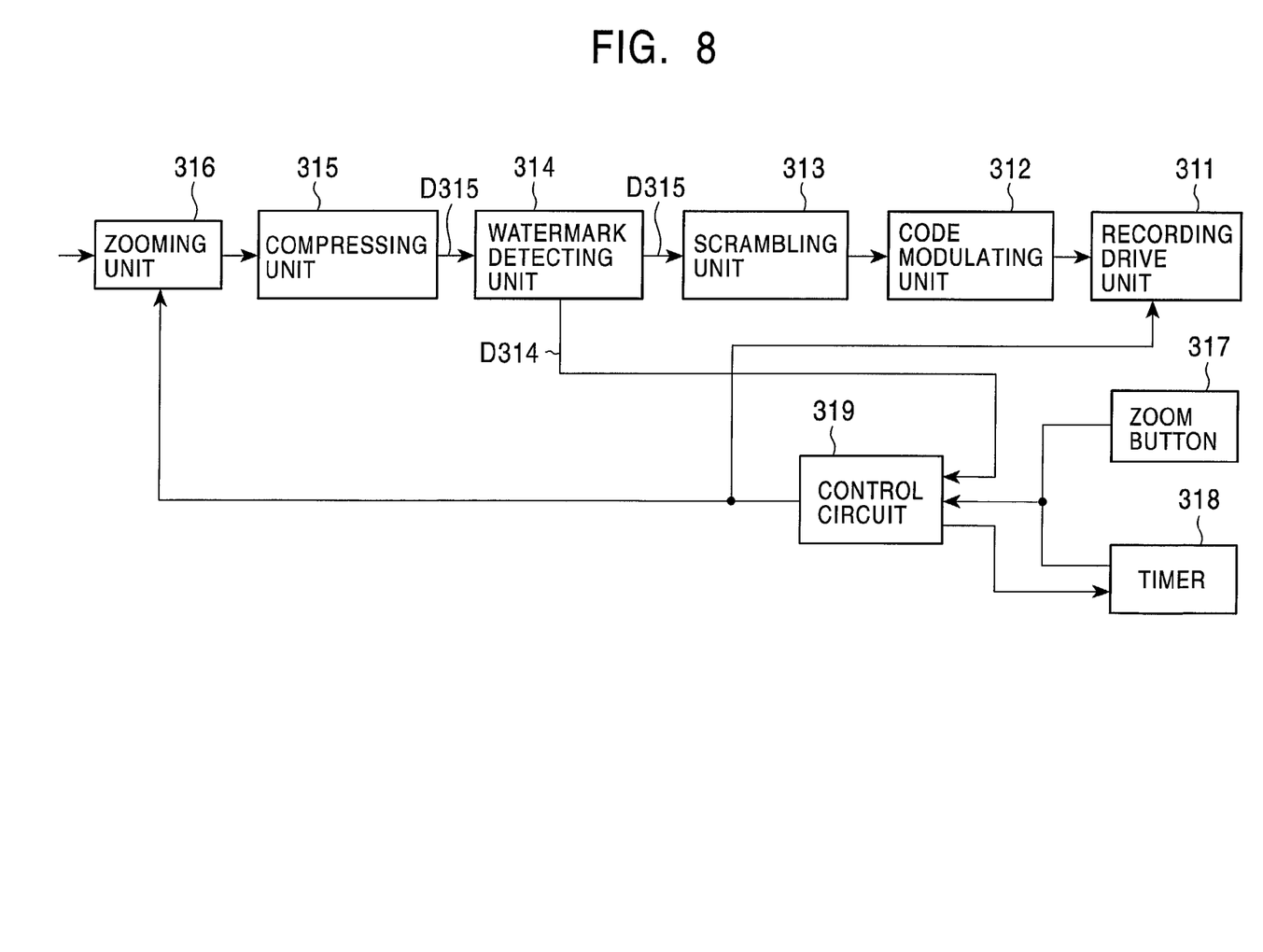
FIG. 8 is a block diagram of a DVD recorder according to still another embodiment of the present invention.

While a DVD player incorporating the present invention has been described in the preferred embodiment, the present invention is not limited thereto, and a DVD recorder may also be implemented. FIG. 8 illustrates a DVD recorder embodying the present invention. The DVD recorder includes a zooming unit 316, which corresponds to the zooming unit 16 shown in FIG. 3, for performing processing such as zooming of the input video signals. The DVD recorder also includes a control circuit 319 which allows a zooming operation to be performed only for a restricted period of time, thereby preventing the embedded watermark information from being undetectable for a long time from the zoomed video signals. Once the watermark information is detected, the recording of the video signals on a DVD is restricted, and copyright of the video image is protected.

Still referring to FIG. 8, the video signals subjected to zooming are compressed, for example, according to MPEG compression by a subsequent compressing unit 315. The compressed video data is designated as D315, from which embedded watermark information D314 is detected by a watermark detecting unit 314 and is then sent to the control circuit 319.

After the embedded watermark information is detected, the video data D315 is scrambled by a scrambling circuit 313, is coded by a code modulating unit 312, and is then recorded on the DVD by a recording drive unit 311. The control circuit 319 controls the recording drive unit 311 based on the watermark information (copy control information) detected by the watermark detecting unit 314 so that the recording of the video data on the DVD may be prohibited or allowed.

When the user operates a zoom button 317 to input a zooming instruction to the control circuit 319, the control circuit 319 controls the zooming unit 316 to execute a zooming operation. The control circuit 319 also instructs the timer 318 to start a time measurement operation, and the timer 318 starts measurement of time accordingly. When the timer 318 determines that a predetermined time has elapsed, the control circuit 319 instructs the zooming unit 316 to discontinue the zooming operation. In response, the zooming unit 316 does not perform the zooming operation on the input video signals, but outputs the signals. Therefore, in the DVD recorder, the zooming operation is also discontinued after a predetermined time has elapsed since the start of the zooming operation. Once the zooming operation on the video signals has been discontinued, the embedded watermark information can be detected therefrom by the watermark information detector 314, and the recording of the video signals on the DVD can be controlled according to the detected watermark information. The copyright of the video image is thus protected.

While a DVD player and a DVD recorder have been described and illustrated, the present invention is not limited thereto, and may also be applied to any other player or recorder using a variety of recording media such as compact discs.

While a player for reading video signals from a recording medium and a recording apparatus for recording video signals on a recording medium, both including a processor unit such as a zooming unit, have been described and illustrated, the present invention is not limited thereto. For example, an editor having an independent processor unit may also be implemented.

In the illustrated embodiments, a zooming operation is performed on video signals, but the operation is not limited thereto. The present invention may also encompass other signal processing, such as image rotation, inversion, cropping in which some portions of the image are cropped, or image shifting, which operations may change the number of pixels or lines, or their positions, or which may involve interpolation or decimation. Again, such processing may be discontinued after a predetermined time.

While a case in which a zooming operation is discontinued after a predetermined time from initiation has been described and illustrated, the present invention is not limited thereto. For example, the control circuit 19 may not accept any zooming instruction from the user for a certain period of time (e.g., one minute) after the zooming operation has been discontinued. This prevents unnecessary operation of the timer 18 when the user continues to press the zoom button 17. The time period during which the control circuit 19 does not accept any zooming instruction from the user may also be determined depending upon the number of previously performed zooming operations. For example, the control circuit 19 may count the number of times the zoom button has been pressed by the user, whereby greater numbers of button pressings may result in longer periods of time until the zooming instruction can be accepted after the zooming operation has been discontinued. This prevents intentional reproduction of video images containing "copying prohibited" information.

While a case in which a zooming operation is discontinued after a predetermined time since the zooming operation was initiated has been described and illustrated, the present invention is not limited thereto. For example, the control circuit 19 may count the number of zooming operations of the user such that when the counted number exceeds a predetermined number, no more zooming operation are allowed. This prevents the user from intentionally repeating zooming operations to prevent the detection of embedded watermark information.

In the illustrated embodiments, processing such as zooming on video signals is discontinued after a predetermined time, but the present invention is not limited thereto. For example, referring again to FIG. 3, the control circuit 19 may modify the control of the zooming operation according to the content of the embedded watermark information (copy control information) D14. That is, when the copy control information detected by the watermark detecting unit 14 represents "copying allowed," an instruction to discontinue the zooming operation may not be issued to the zooming unit 16 regardless of the elapsed time determined by the timer 18, and the zooming operation will continue executing. The user can therefore process the video signals containing "copying allowed" information as desired to facilitate editing and the like.

While copy control information superposed on video signals as watermark information has been described and illustrated, the present invention is not limited thereto. Other information including identification information for identifying a copyright owner may also be added to video signals as watermark information. Since a zooming operation is discontinued after a predetermined time in accordance with the present invention, a continuous undetectable state of the copyright information superposed on video signals is avoided. The originator of the video signals is also identified without fail.

In the illustrated embodiments, video signals having watermark information superposed thereon are subjected to processing such as zooming. However, the present invention is not limited thereto, and other signals such as speech or voice signals may be processed instead according to the present invention.

The invention claimed is:

1. A data processing apparatus, comprising:
   a first processor operable to perform a first process on signal data that includes copyright information to produce first processed data that includes the copyright information;

a second processor operable to perform a second process on the first processed data to produce second processed data that does not include the copyright information;

an output unit operable to output the second processed data when said second processor performs the second process and to output the first processed data when said second processor does not perform the second process;

a measurement unit operable to measure the time that said second processor has performed the second process and to determine a predetermined processing time from a processing record; and a controller operable to control terminate operation of said second processor when the measured time equals the predetermined processing time.

2. An apparatus according to claim 1, wherein the processing record includes a count of requests for the second process, and said controller controls the operation of said second processor based on the count.

3. An apparatus according to claim 1, wherein the copyright information includes recording control information for controlling the recording of the output data onto a medium.

4. An apparatus according to claim 1, wherein the output data includes image data, and said output unit outputs the output data for display on a screen.

5. An apparatus according to claim 1, wherein the output data includes speech data, and said output unit outputs the output data as speech.

6. An apparatus according to claim 1, wherein the output data includes image data, and said output unit transmits the output data.

7. An apparatus according to claim 1, wherein the output data is speech data, and said output unit transmits the output data.

8. An apparatus according to claim 1, wherein the second process is selected from the group consisting of: zooming, image rotation, image inversion, image cropping, image shifting, changing a number of pixels or a number of lines in the image, changing a position of pixels or a position of lines in the image, an interpolation operation, and a decimation operation.

9. A method for processing data and for outputting processed data, said method comprising:

performing a first process on signal data that includes copyright information to produce first processed data that includes the copyright information performing a second process on the first processed data to produce second processed data that does not include the copyright information;

outputting the second processed data when the second process is performed and outputting the first processed data when the second process is not performed;

measuring the time that the second process has been performed;

determining a predetermined processing time from a processing record; and terminating the second process when the measured time equals the predetermined processing time.

10. A method according to claim 9, wherein the processing record includes a count of requests for the second process, and said terminating step terminates the second process based on the count.

11. A method according to claim 9, wherein the copyright information includes recording control information for controlling the recording of the output data onto a medium.

12. A method according to claim 9, wherein the output data includes image data, and the output data is outputted for display on a screen.

13. A method according to claim 9, wherein the output data includes speech data, and the output data is outputted as speech.

14. A method according to claim 9, wherein the output data includes image data, and the output data is transmitted.

15. A method according to claim 9, wherein the output data includes speech data, and the output data is transmitted.

16. A method according to claim 9, wherein the second process is selected from the group consisting of: zooming, image rotation, image inversion, image cropping, image shifting, changing a number of pixels or a number of lines in the image, changing a position of pixels or a position of lines in the image, an interpolation operation, and a decimation operation.

17. A data reading apparatus, comprising:

a reader operable to read signal data that includes copyright information from a medium;

a first processor operable to perform a first process on the read data to produce first processed data that includes the copyright information;

a second processor operable to perform a second process on the first processed data to produce second processed data that does not include the copyright information;

an output unit operable to output the second processed data when said second processor performs the second process and to output the first processed data when said second processor does not perform the second process;

a measurement unit operable to measure the time that said second processor has performed the second process and to determine predetermined processing time from a processing record; and a controller operable to terminate operation of said second processor when the measured time equals the predetermined processing time.

18. An apparatus according to claim 17, wherein the processing record includes a count of requests for the second process, and said controller further controls the operation of said second processor based on the count.

19. An apparatus according to claim 17, wherein the copyright information includes recording control information for controlling the recording of the output data onto another medium.

20. An apparatus according to claim 17, wherein the output data includes image data, and said output unit outputs the output data for display on a screen.

21. An apparatus according to claim 17, wherein the output data includes speech data, and said output unit outputs the output data as speech.

22. An apparatus according to claim 17, wherein the output data includes image data, and said output unit transmits the output data.

23. An apparatus according to claim 17, wherein the output data includes speech data, and said output unit transmits the output data.

24. An apparatus according to claim 17, wherein the second process is selected from the group consisting of: zooming, image rotation, image inversion, image cropping, image shifting, changing a number of pixels or a number of lines in the image, changing a position of pixels or a position of lines in the image, an interpolation operation, and a decimation operation.

25. A data recording apparatus, comprising:

a first processor operable to perform a first process on signal data that includes copyright information to pro duce first processed data that includes the copyright information;

a second processor operable to perform a second process on the first processed data to produce second processed data that does not include the copyright information;

an output unit operable to output the second processed data when said second processor performs the second process and to output the first processed data when said second processor does not perform the second process;

a recorder operable to record the output data onto a medium;

a measurement unit operable to measure the time that said second processor has performed the second process and to determine a predetermined processing time from a processing record; and a controller operable to terminate operation of said second processor when the measured time equals the predetermined processing time.

26. An apparatus according to claim 25, wherein the processing record includes a count of requests for the second process, and said controller further controls the operation of said second processor based on the count.

27. An apparatus according to claim 25, wherein the copyright information includes recording control information for controlling the recording of the output data onto said medium.

28. An apparatus according to claim 25, wherein the second process is selected from the group consisting of: zooming, image rotation, image inversion, image cropping, image shifting, changing a number of pixels or a number of lines in the image, changing a position of pixels or a position of lines in the image, an interpolation operation, and a decimation operation.

* * * * *

UNITED STATES PATENT AND TRADEMARK OFFICE
CERTIFICATE OF CORRECTION

PATENT NO. : 7,013,078 B2
APPLICATION NO. : 09/750370
DATED : March 14, 2006
INVENTOR(S) : Jun Hirai It is certified that error appears in the above-identified patent and that said Letters Patent is hereby corrected as shown below:

On the cover page of the patent in Item (54), "DATA PROCESSING APPARATUS, DATA PROCESSING METHOD, DATA READING APPARATUS, AND RECORDING APPARATUS", should read --DATA PROCESSING APPARATUS, DATA PROCESSING METHOD, DATA READING APPARATUS, AND DATA RECORDING APPARATUS--.

Column 1, line 1, the title of the invention, "DATA PROCESSING APPARATUS, DATA PROCESSING METHOD, DATA READING APPARATUS, AND RECORDING APPARATUS", should read -- DATA PROCESSING APPARATUS, DATA PROCESSING METHOD, DATA READING APPARATUS, AND DATA RECORDING APPARATUS--.

Column 11, line 12, after "to", delete "control".

Column 12, line 67, after "pro", insert "-".

Signed and Sealed this

Eleventh Day of July, 2006

JON W. DUDAS
*Director of the United States Patent and Trademark Office*